United States Patent [19]

Haslund

[11] Patent Number: 4,671,474
[45] Date of Patent: Jun. 9, 1987

[54] FLUID CONTROL APPARATUS AND METHOD UTILIZING CELLULAR ARRAY CONTAINING MINI-VORTEX FLOW PATTERNS

[75] Inventor: Ralph L. Haslund, Mercer Island, Wash.

[73] Assignee: The Boeing Company, Seattle, Wash.

[21] Appl. No.: 623,153

[22] Filed: Jun. 21, 1984

[51] Int. Cl.[4] .................. B64C 21/06; B64C 23/06
[52] U.S. Cl. ............................... 244/199; 244/209
[58] Field of Search ............... 244/198, 200, 204, 209, 244/199

[56] References Cited

U.S. PATENT DOCUMENTS 1,903,823  4/1933  Lougheed ..................... 244/200
2,899,150  8/1959  Ellis, Jr. ........................ 244/200

*Primary Examiner*—Galen Barefoot
*Attorney, Agent, or Firm*—Schwartz, Jeffery, Schwaab, Mack, Blumenthal & Evans

[57] ABSTRACT

An apparatus for controlling flow over a surface, especially transonic flow, including means for embedding within the surface small vortices with their axes parallel to said surface and transverse to said fluid flow, and means for driving said vortices.

14 Claims, 8 Drawing Figures

FLUID CONTROL APPARATUS AND METHOD UTILIZING CELLULAR ARRAY CONTAINING MINI-VORTEX FLOW PATTERNS

BACKGROUND OF THE INVENTION

This invention relates to controlling fluid flow over a surface, especially transonic flow, and has particular but not exclusive application to aircraft traveling at high Mach numbers, a situation where flow separation can occur.

Flow accelerates as it passes over the forward increasing cross section of an obstruction. As the local flow velocity increases the local static pressure decreases. When the flow tries to close in behind the obstruction it must both decelerate and increase in pressure. If the amount of local deceleration and pressure increases are too great the flow separates from the body surface. This phenomenon normally occurs in subsonic flow because of viscous losses in the foot of the boundary layer which prevent the necessary pressure recovery. In transonic flow (subsonic flow having an embedded region of supersonic flow), separation normally occurs because of the steep pressure recovery required by the recompression shock added to the gradual pressure recovery required by the surface curvature. In general, the higher the freestream (incident) velocity and the more bluff the obstruction, the greater the increase in boundary layer edge flow velocity and the more difficult it is for flow to remain attached past that part of the obstruction having the greatest cross-section transverse to the flow direction.

The undesirable effects of flow separation range from annoying to catastrophic. From a simple fluid mechanical standpoint, separation increases body drag, unsteady buffet pressure loads on the body, and loss of lift. From an aero-optical standpoint, separation causes unsteady shear layers through which it is difficult to propagate optical radiation without unacceptably large and nonuniform losses in intensity. These negative effects increase with the freestream Mach number, especially in the transonic range with the creation of additional vorticity downstream of the recompression shock.

It has been known since the 1920's that removal of the low kinetic energy foot of the boundary layer (the part closest the surface) by distributed suction through holes in the surface under the boundary layer will prevent separation in all subsonic flow. Recent testing has shown that this technique is ineffective in transonic flow.

In weak transonic flow the most commonly used technique for at least delaying separation, that is, causing separation to occur farther downstream around an obstruction such as a bluff body or airfoil, is to use short vertical fins attached to the surface which forces the mixing of the higher and lower energy regions of the boundary layer and imparts energy to the fluid near the surface. This technique is most effective where the boundary layer is thin. A variation in this technique involves the use of spaced jets which are injected across the incident stream. Both of these techniques have been referred to as vortex generators because of the relatively large scale vortex-like mixing they induce.

One of the most effective techniques for delaying separation in moderately transonic flow with thick boundary layer is to use streamwise slot blowing oriented as nearly tangentially to the downstresam surface as possible. The major drawbacks in this technique are that it causes boundary layer thickening and that it has a limited range of influence.

A final flow separation suppression technique involves rotating the surface in the direction of flow to weaken the velocity gradient through the boundary layer. For practical reasons, this technique has been primarily of academic interest.

All of the techniques described above fail to prevent shock-induced separation in moderately strong transonic flow.

Another technique known in the prior art for controlling subsonic flow over a surface involves generating a single, long vortex in the surface which rotates about an axis transverse to the flow. For example, U.S. Pat. No. 2,841,182 to Scala shows the use, in a diffuser, of a stepped-slot for retaining a large driven vortex. The vortex is sustained by withdrawing low-energy fluid from the center of the vortex using a perforated tube at the center of the slot.

It is also known to use a single, long spanwise vortex on an airfoil to increase its efficiency. For examle, French Pat. No. 825,134 to Riabouchinsky shows the use of centrifugal pumps located at either end of a long spanwise slot on an airfoil which pump air from the center of the slot and so sustain a long spanwise vortex within it.

SUMMARY OF THE INVENTION

The present invention comprises a dense plurality of small, actively-driven cylindrical vortices trapped in an array of cells in the surface of a body. The trapped vortices change the wall velocity boundary condition from zero to a value which is a substantial fraction of the incident edge flow velocity. The axes of the drien vortices are oriented parallel to the surface in which they are embedded and transverse to the incident freestream. The vortices are driven by sucking out the low energy cores through holes at either end of the vortice in the cell which contains each. It has been discovered that the use of such an apparatus prevents flow separation by "stitching down" the flow underneath and downstream of the recompression shock. The additional effect of the discrete vortices is to break down the large recompression shock into a series of smaller recompression shocks in the continued process of prevention of flow separation.

BRIEF DESCRIPTION OF THE DRAWINGS

The invention will be more fully understood from the following detailed description of preferred embodiments thereof, taken in connection with the accompanying drawings, wherein.

DETAILED DESCRIPTION OF THE PREFERRED EMBODIMENTS

Figure 1:
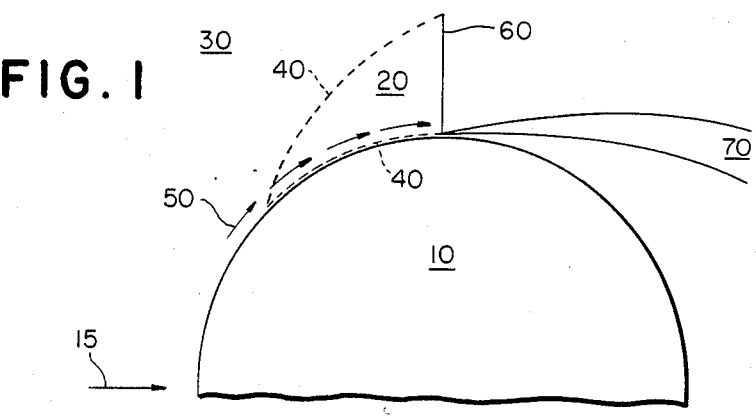
FIG. 1 is a diagram of model transonic flow over a bluff body.

Throughout the following description, similar reference numerals refer to similar elements in all figures of the drawings.

FIG. 1 is an illustration of a classic transonic flow pattern in which a model bluff body 10 is positioned in an airstream flowing in the direction of arrow 15 and having a freestream velocity of about Mach 0.7. The transonic flow pattern has an embedded supersonic flow region 20 located beneath a subsonic flow region 30 and separated from same by a boundary designated by sonic line 40, shown in phantom. Immediately adjacent to the surface of bluff body 10 is boundary layer 50 of subsonic and supersonic flow. Region 20 is bounded on its downstream side by recompression shock 60. The rapid recompression and deceleration of fluid at the downstream portion of region 20 adjacent recompression shock 60 results in a separation shear layer 70.

Figure 2:
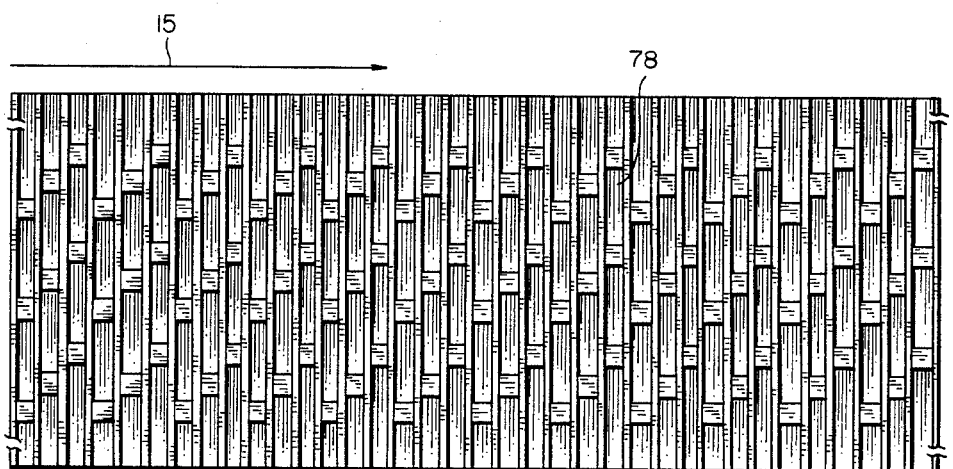
FIG. 2 is a top-plan view of a surface incorporating the present invention.

FIG. 2 shows a top plan view of a surface incorporating a preferred embodiment of the present invention. The directon of freestream flow is from the left of the drawing to the right as shown by arrow 15. As is visible in the drawing, the surface is provided with array means 75 for retaining vortices, which in the preferred embodiment is a plurality of cells.

Figure 3:
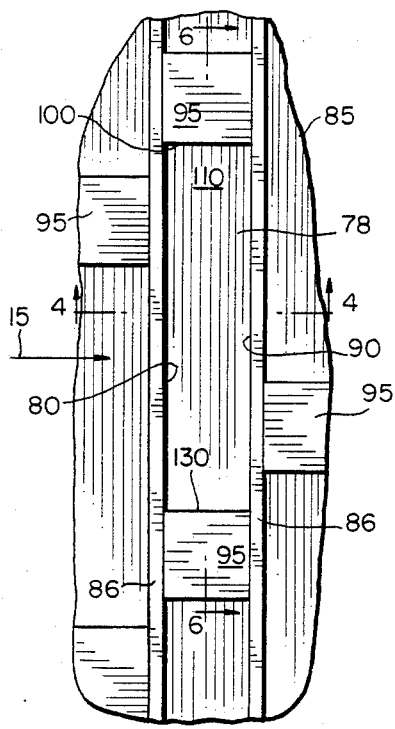
FIG. 3 is a close-up view of the surface shown in FIG. 2.

FIG. 3 shows a typical cell 78 having a rectangular cross-section when viewed from the top with bottom 110 and sides 80, 90, 100, and 130. The cells are arranged in slots 85 transverse to the flow formed by dividers 86. Each slot, in turn, is divided by partitions 95. The sides of the slot make up walls 80 and 90; the inside faces of the partitions make up walls 100 and 130. Cell 78 is preferably small, that is, its profile surface area is small compared to the surface in which it is embedded. As shown in FIG. 2, partitions from one slot to the next may be staggered to create a tiered array that repeats, for example, every third row. Staggering prevents large contiguous surfaces over which there is no suction or vortices.

It is preferred as a general design criterion to dispose the cells comprising array means 75 sufficiently proximate to one another that there are no large contiguous surfaces having no embedded vortices. The optimum arrangement for this purpose is a dense array, that is, an array wherein the cells are substantially adjacent one another, as shown in FIG. 3. As seen therein, each rectangular cell is separated from cells in the immediately neighboring slots by the narrow divider 86, and from neighboring cells in the same slot by partition 95, which is about one-quarter of a cell length long. This serves to create a dense array. It will be apparent to one of ordinary skill in the art, however, that other relative displacements will satisfy the general design criterion.

Figure 4:
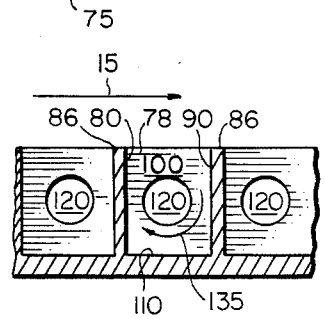
FIG. 4 is a cross-sectional view of the invention taken along line 4—4 of FIG. 3.
Figure 5:
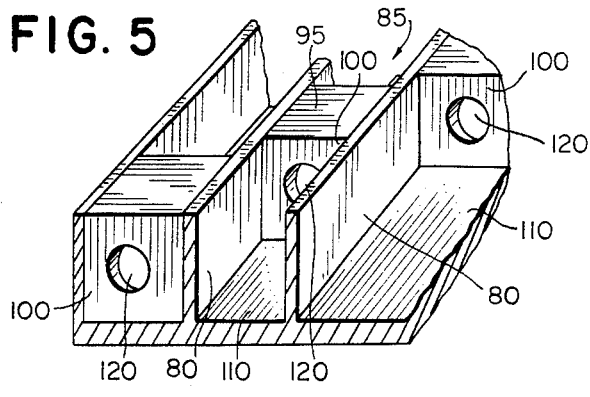
FIG. 5 is a perspective view of the invention, shown partially in section and corresponding to the structure shown in FIG. 4.

Reference is now made to FIGS. 4 and 5 wherein FIG. 4 is a cross-sectional view of the cellular array taken along line 4—4 of FIG. 3, and FIG. 5 is a perspective view, shown partially in section and corresponding to the structure of FIG. 4. The flow direction is as indicated by arrow 15. Visible now are dividers 86 in cross section and holes 120 in the side 100 of the cell. Hole 120 communicates with suction means as described below. The flow over the top of cell 78 together with flow out of cell 78 through hole 120 create a vortex within cell 78 spiraling in the direction of the curved arrow 135. The scale of the vortex within cell 78 is determined by the interior dimensions of cell 78. Inasmuch as the interior dimensions of the cell are small compared with the radius of curvature of the body on which it is located, it is appropriate to refer to the embedded vortex as a "mini vortex." The cell is as deep as it is wide, giving it a square cross-section as shown in FIG. 4.

Figure 6:
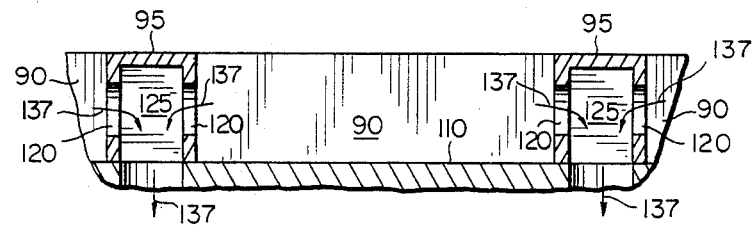
FIG. 6 is a cross-sectional view of the invention taken along line 6—6 of FIG. 3.

FIG. 6 is a cross-sectional view of the structure shown in FIG. 3 taken along line 6—6. Visible now are channel means 125 connected to holes 120 for drawing fluid therethrough. Fluid flows in the direction of the arrows 137 as shown.

Figure 7:
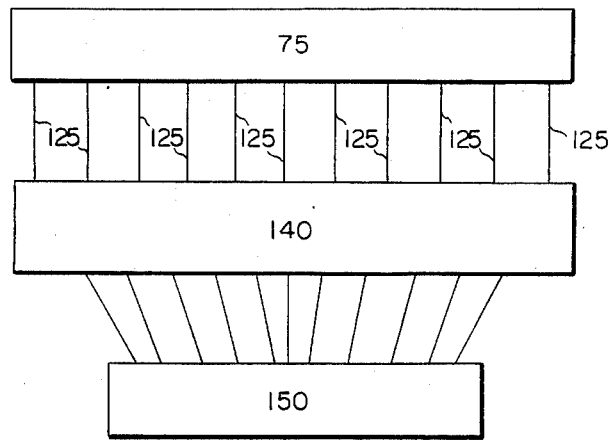
FIG. 7 is a schematic diagram of the present invention.

FIG. 7 is a schematic diagram of the means for pumping fluid out of the cells. Cell array means 75 communicates in the manner described above to channel means 125. The fluid drawn through channel means 125 then passes into a manifold 140. The manifold pressure is maintained low enough to ensure choked (sonic) flow at the hole 120 at the lowest static pressure point outside the array 75 to obtain the required local suction mass flow. Fluid then flows to suction means 150, which is any conventional device for inducing negative pressure, e.g. a pump.

According to the present invention, there are two primary modes of vortex flow interaction. In the relatively weak vortex case, deflection of the outer flow in passing over the cells is minimal as the mass removal through the vortex core is relatively small. In this case, the dominant effect is preservation of the sonic flow velocity at the foot of the shock acting as a near surface tangential jet.

Figure 8:
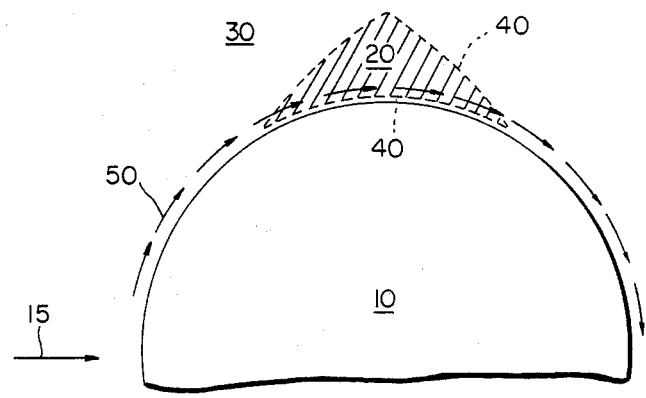
FIG. 8 is a diagram of transonic flow over a bluff body the surface of which incorporates the present invention.

The other mode of vortex flow interaction involves the relatively strong vortex mode. In this case, the flow deflection over the cells is strong and slot vortex development is also strong. The remarkable effect which appears to be unique to this flow situation is the creation of nearly symmetric supersonic flow fields on both the expansion and compression sides. The normally strongly localized single shock is broken up into small increments over which approximate flow symmetry is maintained. Tests conducted using a worst case two-dimensional flow cylinder in transonic flow show that as suction through hole 120 is increased, separation is delayed further and further around the circumference of the bluff body. It appears as if flow is being "stitched down" farther downstream around the body. If the suction is great enough, flow separation is completely prevented thereby eliminating the separation layer 70 of FIG. 1. This effect is shown in FIG. 8, which is derived from actual schlieren photographs of flow about a cylindrical bluff body.

Expressing the theory of operation of a minivortex array mathematically, the basic equation for two-dimensional boundary layer flow over a curved surface is given by $$\rho u(\partial/\partial x) + \rho v(\partial u/\partial y) = -(\partial p/\partial x)$$

where:

$\rho$ = density;

u = velocity component in the x-direction (streamwise);

v = velocity component in the y-direction (normal to the surface); and p = pressure.

Upstream of the portion of greatest cross-section of a body of elements $\partial u/\partial x$ and $\partial u/\partial x$ are both positive at a normal continuous surface and $\partial p/\partial x$ is negative. Past the portion of greatest cross-section, $\partial p/\partial x$ becomes positive. Since u is small and positive at the foot of the boundary layer, $\partial u/\partial x$ must be large and negative to balance the equation. In order to achieve balance, $\partial u/\partial y$ at the surface becomes zero, and separation occurs.

For systems using conventional distributed suction, the $\partial v \partial u/\partial y$ term becomes dominant because v at the surface becomes negative. The limited usefulness of the technique becomes apparent because as $\partial u/\partial x$ at the surface becomes very small, the absolute magnitude of $-v$ must increase accordingly for the term containing both to continue to balance the adverse pressure gradient.

The mini vortex apparatus according to the present invention makes u at the surface large and positive. Then, only a small $-\partial u/\partial x$ is needed to balance $-\partial p/\partial x$. Also, since $\partial u/\partial y$ at the surface is relatively large, the small $-v$ required to remove the low energy cores of the mini-vortices also adds an appreciable contribution from the second term.

A unique feature of the apparatus producing the mini-vortex surface is that it actively makes the first term of the above equation dominant for prevention of flow separation. The apparatus can obviously be used as an alternative to distributed suction to prevent separation in all subsonic flow as almost a trivial case.

In the preferred embodiment, the slots are of rectangular (equal width and depth) cross-section. The partitions are four slot widths apart and are staggered in a three-tier pattern. This arrangement makes the interior volume of the cell to be that of a rectangular parallelepiped (rectangular solid) having equal with and depth, and a length four times its width. The core removal holes 120 have an inlet diameter of one-half the slot width. The downhole diameters through channel means 125 are three-quarters of a slot width.

It should be clear to one of ordinary skill in the art that there will be optimized design solutions for particular flow cases ranging from bluff bodies to conventional transonic airfoils. One design parameter will be minimization of the mass suction rate for a given application. In the tests described above, the maximum mass removal is approximately four percent of the incident mass flow. Optimization of the hole sizes to control local slot vortex effect could reduce required total mass removal by as much as an order of magnitude.

In the embodiment described above, suction or negative pressure alone has been described for use in driving the vortices. It will be apparent to one of ordinary skill in the art that a similar effect could be achieved by blowing or positive pressure. Specifically, with reference to FIG. 6, one of the channel means 125 could be connected to a suction source, while the other could be connected to a source for high-presure fluid for blowing. The low energy core of the vortex would then be blown out. Preferably, the cell would be "focussed" if this arrangement were used, that is, its geometry would be altered to facilitate core removal from the blowing side to the sucking side. It would also be preferable to make the hole on the sucking side slightly larger to accommodate both the blown air and the entrained low energy core of the vortex.

Having described preferred embodiments of the invention, certain other modifications thereto will be apparent to one of ordinary skill in the art. It is understood that these modifications are part of this invention as defined in the appended claims.

What is claimed is:

1. An apparatus for controlling a stream of fluid flowing across a surface comprising:
    a plurality of cross-streamwise slots each lengthwise segmented by a plurality of partitions to define a plurality of open cells embedded in said surface; and
    suction generating means in fluid communication with each of said open cells for actively generating a vortex flow pattern within each open cell when said fluid flows thereover.

2. An apparatus as claimed in claim 1 wherein said open cells are dimensioned and arranged so that said vortex flow pattern has an axis of rotation substantially cross-streamwise and parallel to said surface.

3. An apparatus as claimed in claim 1 wherein each open cell is in the form of a rectangular parallelepiped having a depth to streamwise length aspect ratio of about one to one.

4. An apparatus as claimed in claim 1 wherein said slots are arranged substantially beside one another and wherein said partitions are substantially slotwise narrower than said open cells so that said plurality of slots defines a densely-packed array of open cells.

5. An apparatus as claimed in claim 4 wherein the ratio of the slotwise width of each of said partitions to the slotwise width of each of said open cells is about 1:4.

6. An apparatus as claimed in claim 1 wherein said plurality of slots substantially covers said surface.

7. An apparatus as claimed in claim 1 wherein said partitions are arranged in said slot so that each open cell is in the form of a rectangular parallelepiped in which the ratio of streamwise length to cross-streamwise width is about 1:4.

8. An apparatus as claimed in claim 1 wherein partitions in each slot are laterally displaced with respect to partitions in adjoining slots so that open cells in each slot are staggered with respect to open cells in adjoining slots.

9. An apparatus as claimed in claim 2 wherein each two partitions define between them one open cell, opposed faces of said two partitions respectively defining slotwise ends of said one open cell, and wherein said vortex flow pattern generating means comprises:
    structure defining a hole in each of said opposed faces; and
    means, in common fluid communication with each of said holes, for producing suction.

10. An apparatus as claimed in claim 9 wherein said holes are dimensioned and arranged to remove a low energy core of said vortex flow patern generated in each open cell.

11. An apparatus for a surface of an aircraft for preventing separation from said surface of a boundary layer in a stream of fluid flowing past said surface when said aircraft is in transonic flight, said apparatus comprising:
    a densely-packed array of a plurality of cross-streamwise slots arranged beside one another, each slot being lengthwise segmented by a plurality of partitions spaced apart from each other by a distance substantially greater than a slotwise width of said partitions, to define a plurality of rectangular open cells embedded in and subsantially covering said surface;

structure defining a hole in partition faces defining slotwise ends of each of said open cells; and means, in common fluid communication with each of said holes, for producing suction, thereby generating a vortex flow pattern in each of said cells to prevent boundary layer separation.

12. An apparatus as claimed in claim 11 wherein the streamwise length to slotwise width to depth of each of said open cells is about 1:4:1.

13. A method of controlling a stream of fluid flowing across a surface comprising the step of actively generating a plurality of cross-streamwise rows of small, substantially cylindrical vortices embedded in and substantially covering said surface, the vortices of any row being substantially coaxial and cross-streamwise shorter than said any row.

14. A method of preventing separation from a surface of an aircraft of a boundary layer in a stream of fluid flowing past said surface when said aircraft is in transonic flight, comprising the steps of:
  (a) generating suction; and
  (b) generating a densely-packed array of cross-streamwise rows of small, substantially cylindrical and coaxial vortices embedded in and covering said surface by continuously removing a low energy core of each of said vortices using said suction generated in step (a), wherein said vortices of any row of said rows being substantially shorter than said any row.

* * * * *